United States Patent [19]
Vecellio

[11] Patent Number: 4,554,893
[45] Date of Patent: Nov. 26, 1985

[54] LIGHTWEIGHT ENGINE

[75] Inventor: Anthony M. Vecellio, Royal Oak, Mich.

[73] Assignee: General Motors Corporation, Detroit, Mich.

[21] Appl. No.: 656,519

[22] Filed: Oct. 1, 1984

[51] Int. Cl.[4] .......... F02F 7/00; F16C 3/10

[52] U.S. Cl. .......... 123/41.83; 123/41.74; 123/197 AC; 123/195 S

[58] Field of Search .......... 123/195 R, 195 S, 197 R, 123/197 AC, DIG. 3, DIG. 6, DIG. 7, DIG. 8, 41.72, 41.74, 41.81, 41.83, 41.84

[56] References Cited

U.S. PATENT DOCUMENTS

| | | | |
|---|---|---|---|
| 799,333 | 9/1905 | Heaslet . | |
| 1,024,817 | 4/1912 | Arnold . | |
| 1,093,246 | 4/1914 | Bock . | |
| 1,176,300 | 3/1916 | Layman . | |
| 1,226,978 | 5/1917 | Layman . | |
| 1,286,667 | 12/1918 | Leipert . | |
| 1,287,359 | 12/1918 | Leipert . | |
| 1,326,421 | 12/1919 | Pribil . | |
| 1,355,261 | 10/1920 | Pribil . | |
| 1,382,420 | 6/1921 | Fuller | 123/195 S |
| 1,422,995 | 7/1922 | Link . | |
| 1,433,821 | 10/1922 | Hull | 123/195 R |
| 1,479,225 | 1/1924 | Chilton . | |
| 1,496,365 | 6/1924 | Bouvier . | |
| 1,512,973 | 10/1924 | Bennett et al. . | |
| 1,541,758 | 6/1925 | Baker | 123/197 R |
| 1,621,494 | 3/1927 | Chilton . | |
| 1,690,296 | 11/1928 | Hirth . | |
| 1,705,375 | 3/1929 | Ricardo . | |
| 1,820,633 | 8/1931 | Sampson . | |
| 1,898,100 | 2/1933 | Skillman . | |
| 1,996,211 | 4/1935 | Mutchler . | |
| 2,018,612 | 10/1935 | Good et al. | 123/195 R |
| 2,030,995 | 2/1936 | Loeffler | 123/195 S |
| 2,053,962 | 9/1936 | Lonas et al. . | |
| 2,089,277 | 8/1937 | Loeffler | 123/195 S |
| 2,119,104 | 5/1938 | Hirth . | |
| 2,120,016 | 6/1938 | Bugatti . | |
| 2,225,451 | 12/1940 | Hirth . | |
| 2,275,478 | 3/1942 | Taylor . | |
| 2,341,488 | 2/1944 | Taylor . | |
| 2,491,630 | 12/1949 | Voorhies | 123/DIG. 6 |
| 2,511,823 | 6/1950 | Klotsch | 123/195 S |
| 2,568,473 | 9/1951 | Tucker | 123/195 A |
| 2,628,765 | 2/1953 | Anderson . | |
| 3,064,634 | 11/1962 | Tyce et al. | 123/195 S |
| 3,121,348 | 2/1964 | Reed . | |
| 3,338,229 | 8/1967 | De Lorean et al. . | |
| 3,429,304 | 2/1969 | Wiseman et al. | 123/195 A |
| 3,599,509 | 8/1971 | Romer . | |
| 3,606,874 | 4/1970 | Gregory | 123/195 A |
| 3,822,609 | 7/1974 | Kotoc . | |
| 4,369,742 | 1/1983 | Everts . | |
| 4,383,508 | 5/1983 | Irimajiri et al. | 123/197 AC |

*Primary Examiner*—Craig R. Feinberg
*Assistant Examiner*—David A. Okonsky
*Attorney, Agent, or Firm*—Robert J. Outland

[57] ABSTRACT

Arrangements are disclosed for lightweight engines and components thereof wherein weight reduction and manufacturing simplicity are obtained primarily through the use of a frame, and optionally other components such as a crankshaft and connecting rods, fabricated from formed metal plate or other formable sheet materials to obtain a lightweight engine construction.

12 Claims, 15 Drawing Figures

LIGHTWEIGHT ENGINE

TECHNICAL FIELD

This invention relates to lightweight internal combustion engines, particularly of the automotive type.

BACKGROUND

At present, the most common forms of automotive internal combustion engines for use in passenger cars and the like utilize cylinder block and crankcase castings of iron or aluminum as main portions of the engine frame. This frame usually carries one or more cylinder heads and an oil pan, the latter enclosing a forged or cast crankshaft connected by cast or forged connecting rods to pistons in the cylinders. A camshaft and valve gear actuate valves in the cylinder head while various accessories for the engine and vehicle are mounted externally on the engine frame and driven by V-belts or other means.

Other forms of construction have also been used commercially, including fabricated sheet metal frames, but problems of cost and durability have apparently been responsible for a lack of extensive use of such designs.

SUMMARY OF THE INVENTION

The present invention provides a lightweight internal combustion engine, especially of a type suited for automotive use and including one or more of a number of advantageous features. Among various features which may be included in engine designs according to the invention are:

- A fabricated frame including crankcase and cylinder jacket portions carrying removable cylinder liners, the frame preferably made of formed plate or stiff sheet materials welded or otherwise secured together to form the fabrication;
- Integral (nonremovable) main bearing support webs in the frame carrying an assembled-in-place crankshaft with attached connecting rods and pistons;
- Major portions of the crankshaft and connecting rods fabricated or assembled from formed sheet or plate members;
- Fabricated oil pan, front cover and end bell members;
- Conventional cylinder head with overhead camshaft or, optionally, alternative cylinder head designs including fabricated components, if desired;
- Separate accessory package having a major portion of engine and vehicle accessories mounted in a single package and driven by a single belt and mounted along one side of the engine frame.

The various features of the invention to be subsequently described provide engine arrangements having potential advantages of substantially lighter weight and lower manufacturing cost than engines of more conventional design. Further, reduced service cost may be obtained by provision of the low-cost frame member which may be discarded and replaced, if damaged, rather than attempting repairs at high labor expense.

These and other features and advantages of the invention will be more fully understood from the following description of certain preferred embodiments taken together with the accompanying drawings.

BRIEF DRAWING DESCRIPTION

Figure 11:
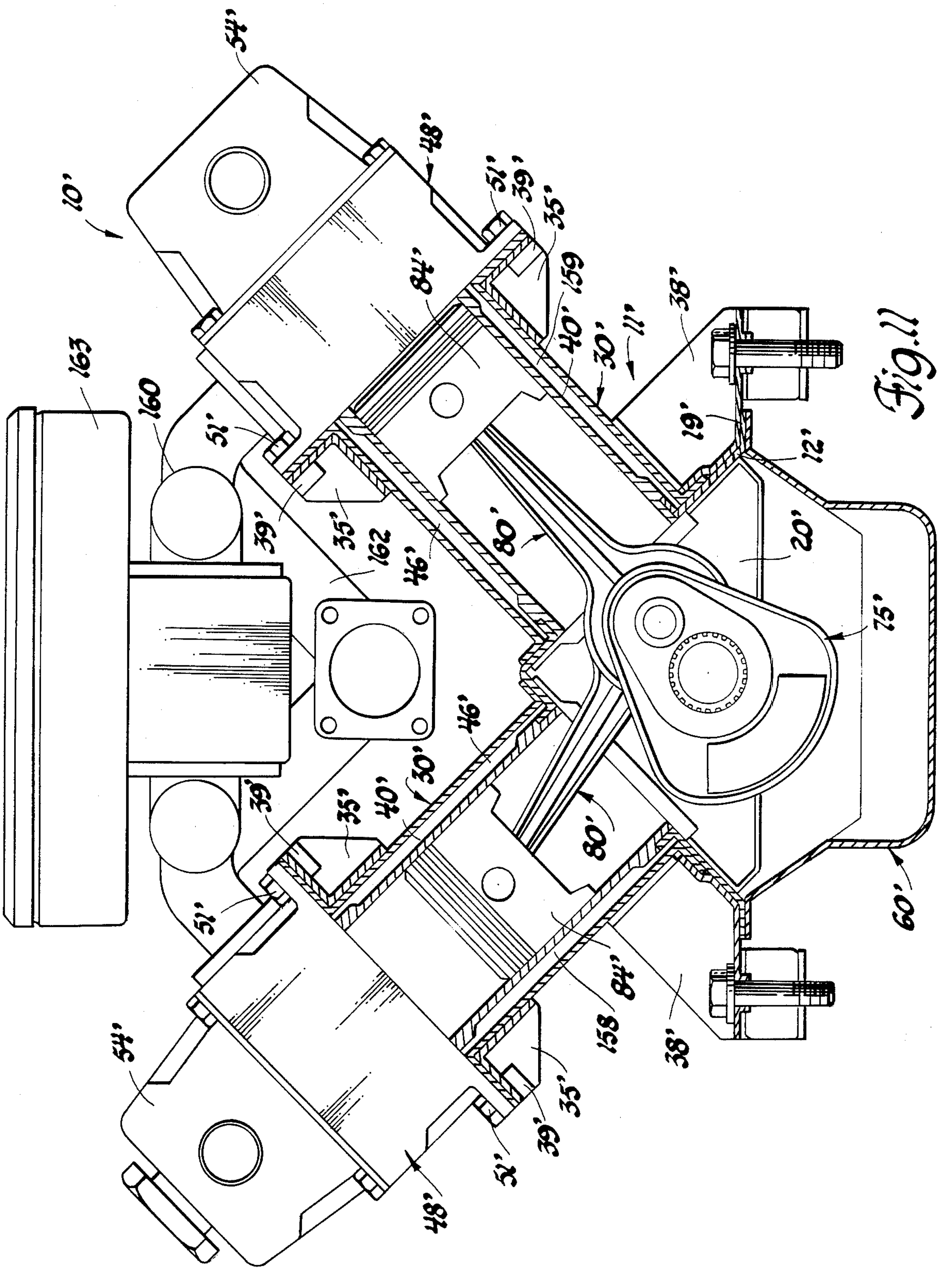

FIG. **10*a* is an end view of a fabricated connecting rod used in the engine of FIGS. 1-6; FIGS. 10*b* and 10*c* are cross-sectional views from the planes of lines 10*b*—10*b* and 10*c*—10*c*, respectively, of FIG. 10*a***;

FIG. 11 is a cross-sectional view illustrating an alternative embodiment of V-type engine formed in accordance with the principles of the invention; and FIGS. **12*a* and 12*b*** are fragmentary cross-sectional views of an alternative embodiment of crankshaft assembly as installed in an engine in accordance with the invention.

DETAILED DESCRIPTION

Referring first to FIGS. 1-6 of the drawings, there is shown an in-line four cylinder internal combustion engine generally indicated by a numeral 10. Engine 10 includes a fabricated frame generally indicated by numeral 11 and made up primarily of members formed from steel plate or stiff sheet steel material spot welded together in an integral assembly. If desired, the frame members could be formed of other suitable materials, such as aluminum or nonmetallic sheet compounds, and could be secured together by any other suitable method or methods appropriate to their specific characteristics and construction.

Figure 7:
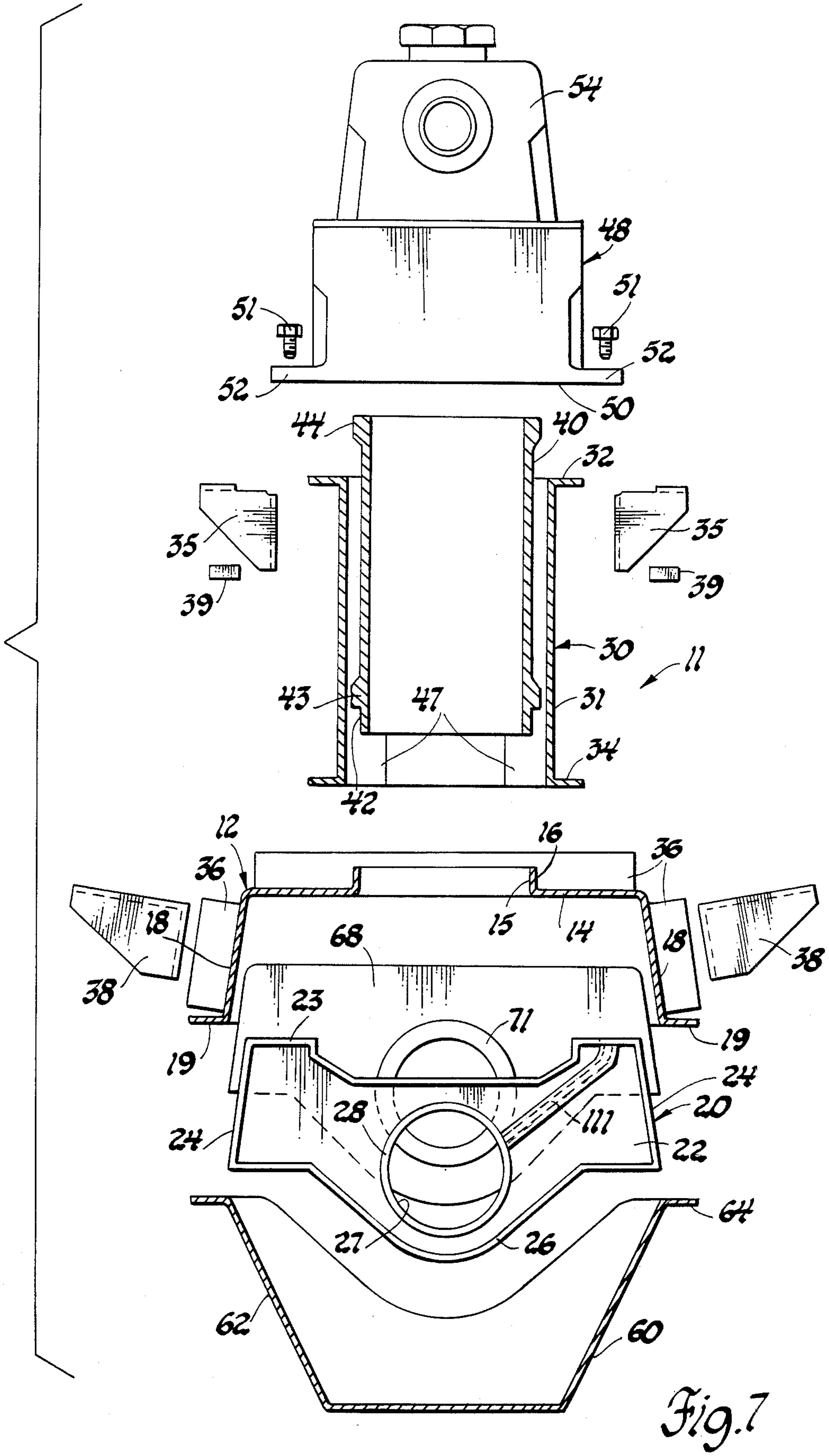
FIG. 7 is an exploded view illustrating main elements of the frame and head assembly and their assembled relationships.

The elements of the fabricated frame (note FIG. 7) include a base member 12 having, in cross-section, an inverted generally U-shaped configuration. The base member 12 defines an upper crankcase wall 14 having four longitudinally spaced cylinder openings 15 defined by upwardly turned flanges 16. Opposite side walls 18 depend from the opposite edges of the upper wall 14 and terminate downwardly in outwardly extending flanges 19.

Between the side walls and against the underside of the upper crankcase wall 14, there are secured five longitudinally spaced transversely extending webs 20. The webs are preferably, but not necessarily, formed as assemblies of two similar stamped metal blanks spot welded back-to-back. The assemblies 20 each define a supporting web portion 22 having outwardly extending upper and side flanges 23, 24 spot welded to the insides of the upper crankcase wall 14 and the side walls 18, respectively. A lower stiffening flange 26 extends across the lower end of the web and below a central opening 27 formed by mating circular flanges 28 which form solid (nonseparable, nondetachable and unsplit) crankshaft support means.

Along the top of the upper crankcase wall 14 and surrounding the cylinder openings 15, there is secured, preferably by spot welding, an upstanding water jacket 30. The jacket 30 is preferably formed as a single sheet metal member to define a continuous vertical wall 31 having upper and lower flanges 32, 34, the latter seated upon and secured to the upper crankcase wall 14.

Additional elements attached to the previously described parts of the frame assembly include longitudinally spaced stiffening and cylinder head attaching brackets 35 spaced longitudinally along the side of the water jacket wall 31 and engaging the upper flange 32, mounting brackets 38 secured to the outer sides of the base member side walls 18 for engaging engine mounts, and threaded nuts 39 welded to the brackets 35 for receiving attaching means to be subsequently described. End bell support tabs 36 are also provided at the rear edges of the base member walls 14, 18.

Within the fabricated frame 11 there are carried four cylinders consisting of removable cylinder liners 40. The liners 40 are of known configuration and each includes a lower pilot 42 with a lower flange 43 girdling the cylinder liner immediately above the pilot. In assembly, the flange 43 seats on the upper end of its respective upturned flange 16 of the base member 12 with the pilot 42 extending within the cylinder opening 15 of the base member. A suitable seal may be provided between the liner and the base member flange if required. At its upper end, each cylinder liner is provided with an upper flange 44.

Between the exteriors of the cylinder liners 40 and the interior of the water jacket 30 there is defined a water, or coolant, chamber 46 to receive coolant for cooling the cylinder liners in conventional fashion. Baffles 47 are preferably provided on the walls of the coolant jacket, extending inwardly between the cylinder liners to minimize the volume of the coolant chamber and to direct water flow against and between the cylinder liner walls. If desired, the baffles 47 could be formed as indentations from the outer walls of the water jacket 30 or, alternatively, as separate welded-on attachments. In either case the formed baffles provide added strength and stiffness to the wall 30 of the coolant jacket.

The open upper ends of the cylinders 40 and the coolant chamber 46 are closed by a cylinder head 48 which may be of conventional construction. The cylinder head has a lower surface 50 which seats against and sealingly engages the upper flanges 44 of the cylinder liners as well as the upper flange 32 of the water jacket 30. The head is secured in place by bolts 51 which extend through a flange 52 of the cylinder head into the threaded nuts 39 carried by the mounting brackets 35 at the upper edge of the water jacket. Suitable gasket or sealing means are used as required to provide the necessary sealing of the water jacket and cylinders against leakage.

The internal construction of the cylinder head 48 is conventional and includes the usual combustion chamber recesses, inlet and exhaust ports and valves, water cooling passages and valve gear including an overhead camshaft, all of which are not shown. The camshaft is conventionally enclosed by a valve cover 54 mounted on top of the cylinder head in conventional manner. If desired, it would be possible to substitute for the conventional cylinder head any suitable substitute form having the same function. For example, the usually cast construction could be replaced by a redesigned substitute cylinder head construction assembled largely from formed sheet metal components should such a cylinder head arrangement be made commercially available.

Along opposite sides of the engine and connecting respectively with the intake and exhaust ports, intake and exhaust manifolds 55, 56, respectively, are mounted on the cylinder head. The manifolds are illustrated herein as of simple log-type construction having four spaced inner port connecting legs 58 and a single outwardly opening connection 59. However, the manifolds used may be of any desired configuration or construction suitable for providing the charge distribution, exhaust collection, and tuning requirements of the engine.

At its bottom end, the engine frame 11 defines a partial crankcase which is open at the bottom but is closed in conventional fashion by an oil pan 60, preferably conventionally formed of steel or other suitable sheet material. The pan has the usual centrally depressed body 62 with a lower sump 63 at one end and a peripheral flange 64 which sealingly engages the flanges 19 along the bottom of the base member 12 of the engine frame. The pan is preferably fixed to the frame, such as by welding or adhesive, to form a permanently closed crankcase. However, if desired, bolts or other suitable fastening means, could be provided to engage weld nuts, not shown, secured above the flanges 19 to maintain the oil pan in removable sealing engagement with the base member.

At the front and rear ends of the oil pan 60 and base member 12, seal carrying front and rear walls 67, 68, respectively, are provided which may be separately sealingly attached to the base member and oil pan. However they are preferably secured by welding to the base member at its ends and engage the oil pan by suitable flanges 70 extending around their outer peripheries. The walls 67, 68 carry annular seals 71 provided to seal the front and rear ends of the crankshaft against leakage of oil from and dirt into the oil pan. The seals 71 and their associated support walls 67, 68 need not be split, as is the case in some engine constructions, in view of the built-up installed-in-place character of the crankshaft, to be subsequently described.

At its rear end, the engine frame includes a flywheel housing 72 preferably formed of steel sheet material and attached to the base member 12 of the frame by welding to the previously mentioned support tabs 36. At the engine front end, a two-piece fabricated camshaft and accessory drive cover 74 is provided, extending between the frame base member 12 and the valve cover 54 to enclose drive means to be subsequently described.

Within the crankcase defined by the base member 12 and its attached oil pan 60, there is rotatably supported a built-up crankshaft, generally indicated by numeral 75. The crankshaft 75 includes five main journals 76 supported within annular (unsplit) bearing sleeves 78 that are carried within the flange defined openings 27 of the webs 20 carried within the engine frame. Crankpins 79, provided on the crankshaft between the main journals, connect with connecting rods 80 through unsplit annular bearings 82. The connecting rods are, in turn, connected by piston pins 83 within pistons 84 of conventional construction and reciprocably received within the cylinder liners 40.

Figure 1:
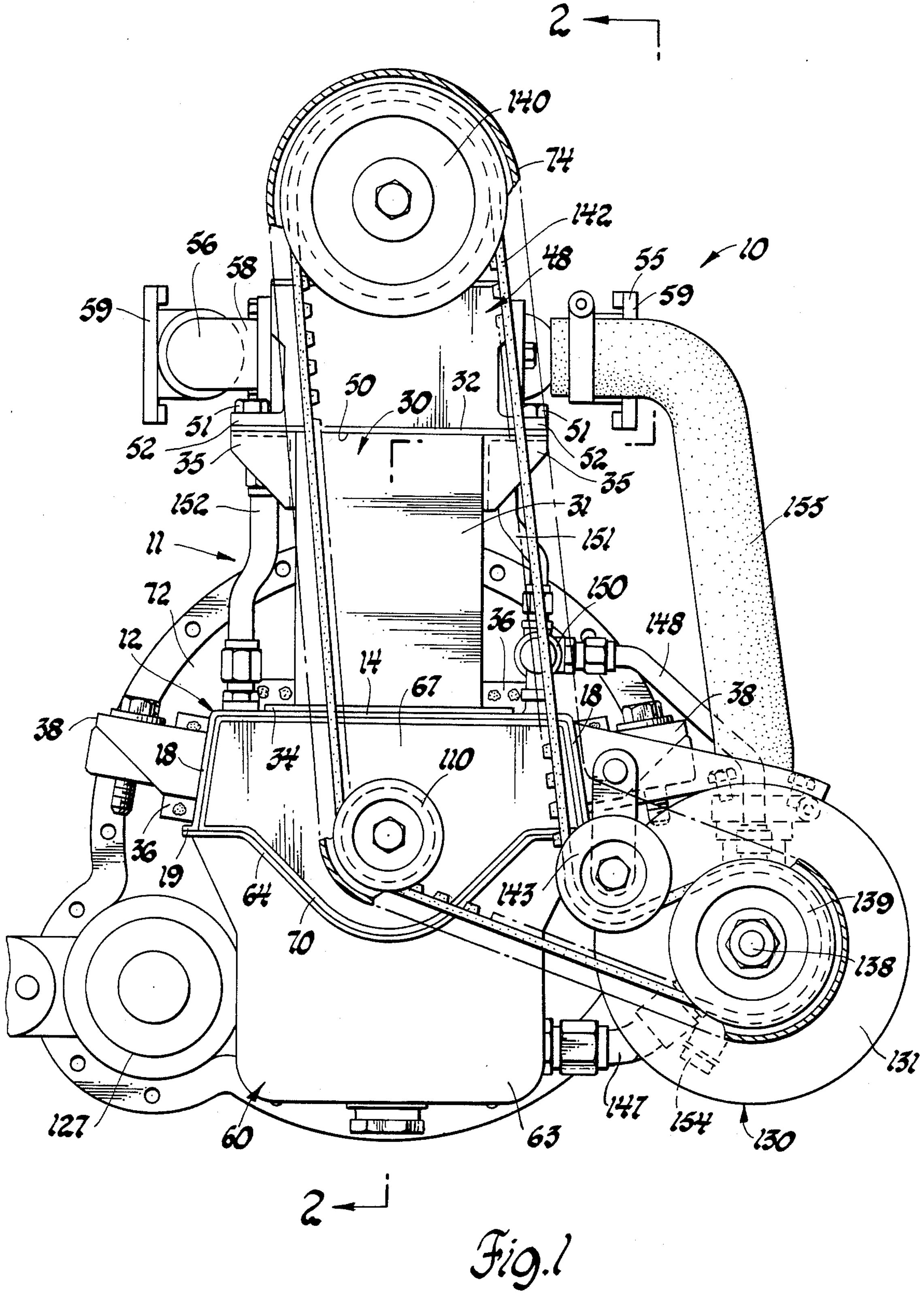
FIG. 1 is a front end view (front cover removed) of an in-line four cylinder version of an automotive type engine formed in accordance with the principles of the invention.
Figure 2:
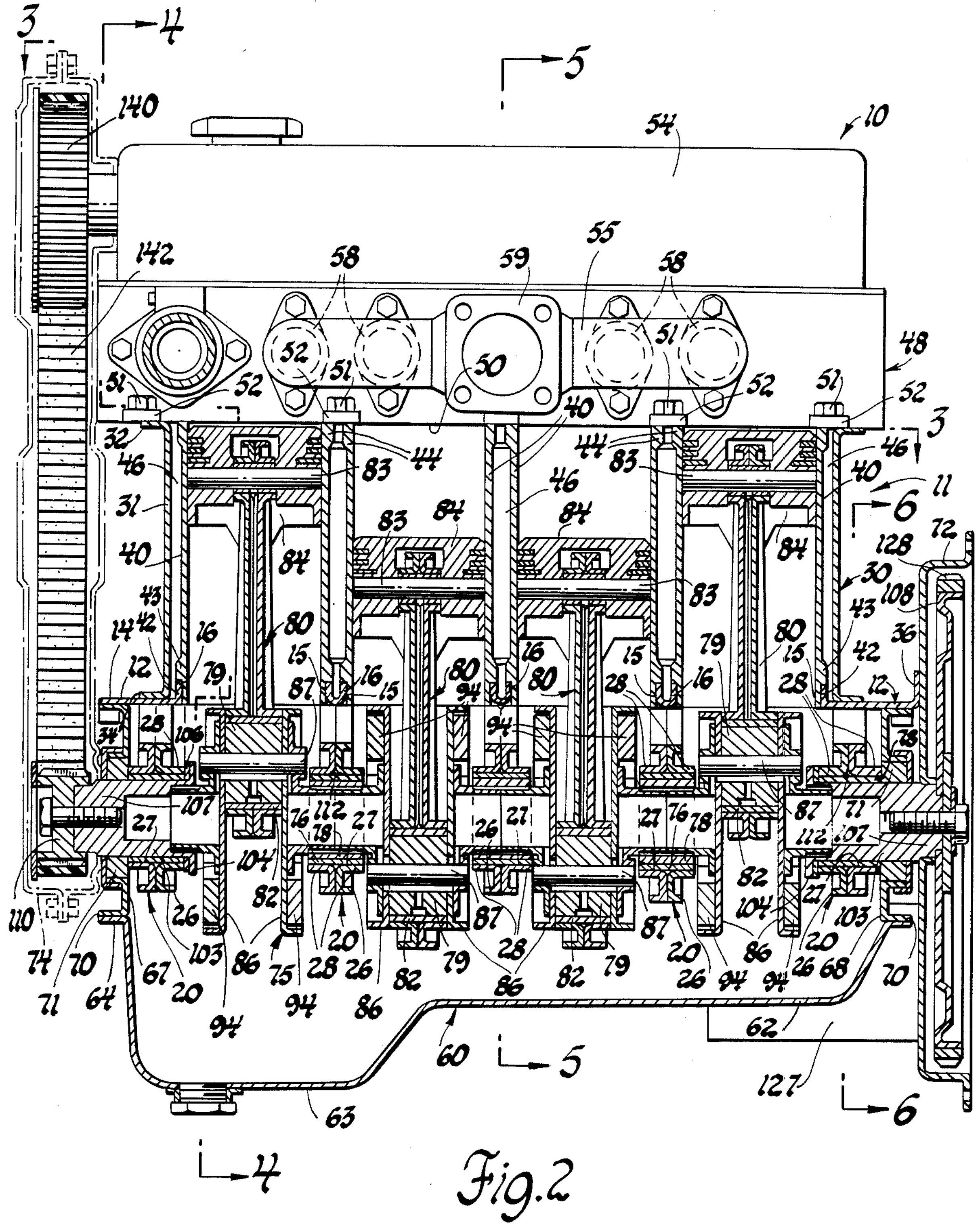
FIG. 2 is a longitudinal cross-sectional view of the engine from the planes generally indicated by the line 2—2 of FIG. 1.
Figure 3:
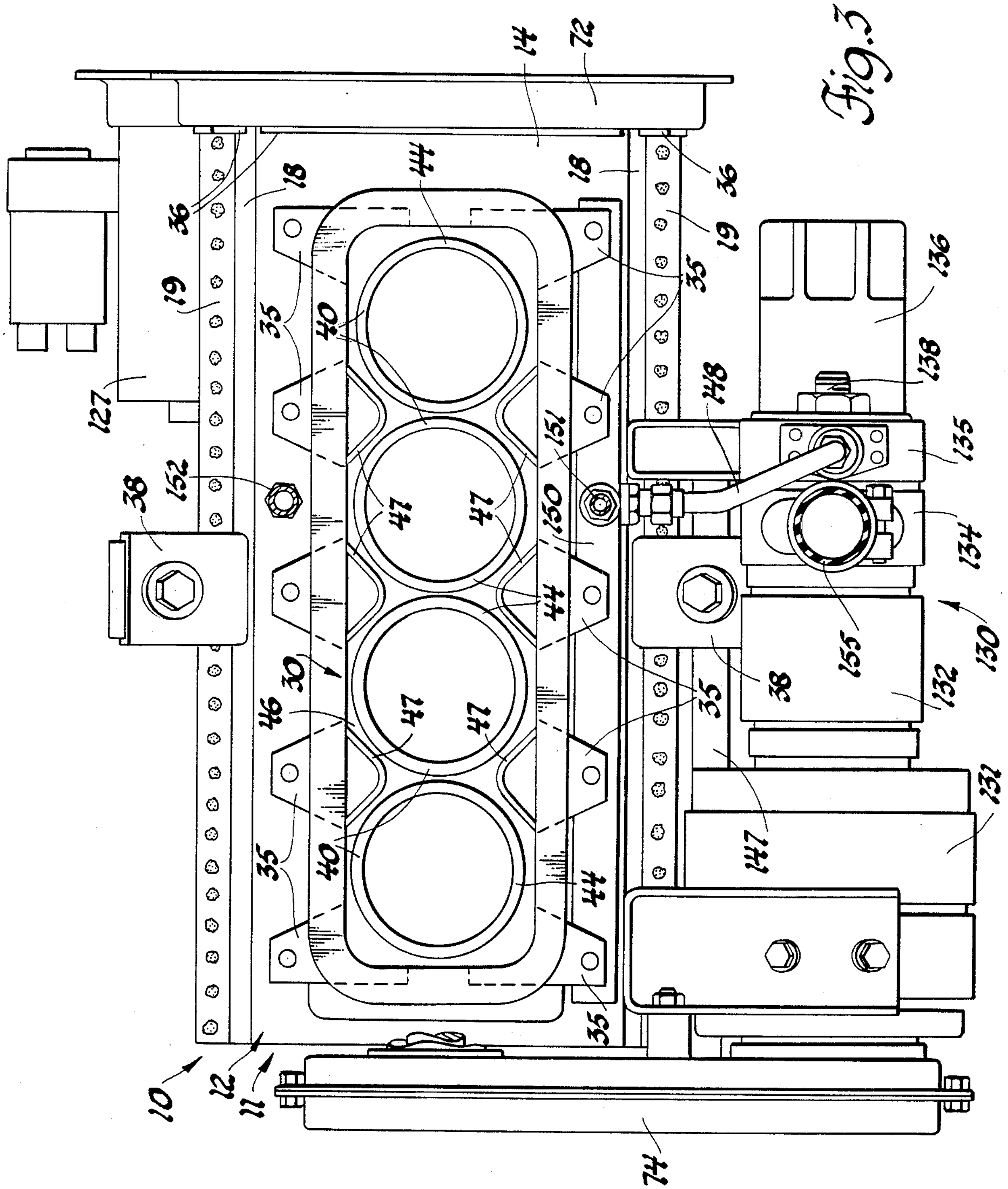
FIG. 3 is a fragmentary cross-sectional view of portions of the engine as seen generally from the planes indicated by the line 3—3 of FIG. 2.
Figure 8:
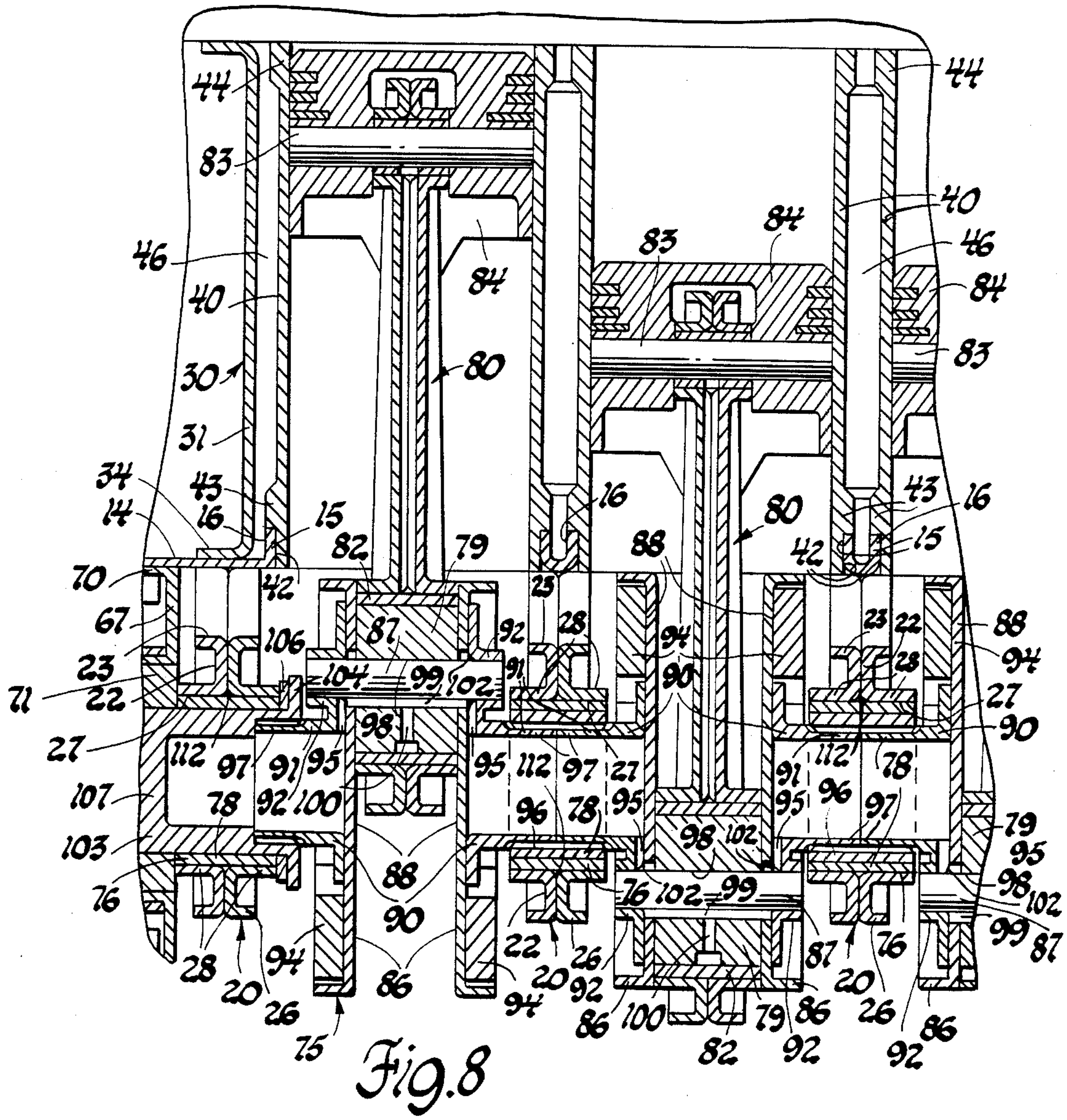
FIG. 8 is a fragmentary cross-sectional view showing portions of the frame, cylinders, crankshaft and reciprocating parts of the engine of FIGS. 1-6.
Figure 9:
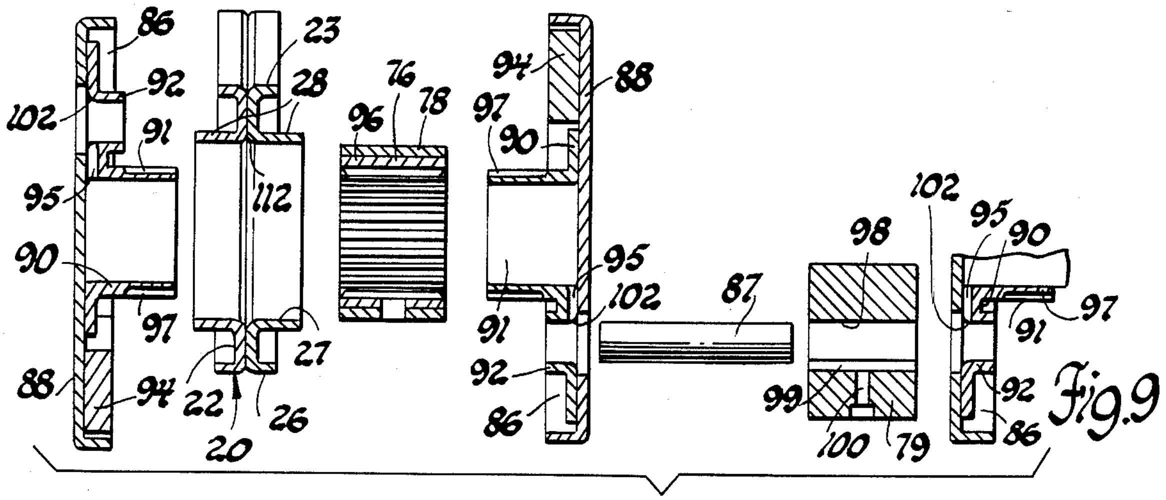
FIG. 9 is an exploded view illustrating some of the components and assembly relationships of portions of the frame and crankshaft of FIG. 8.

The construction of the embodiment of crankshaft 75 illustrated in the engine assembly of FIGS. 1–6 is best shown in FIGS. 2, 8 and 9. This built-up crankshaft assembly is made up of a plurality of identical fabricated crank arms 86, two for each crank throw, together with the main journals 76, the crankpins 79 and support pins 87. The crank arms 86 are each formed from elongated stamped plates 88 having welded thereto a formed connector plate 90. The latter includes a centrally disposed stub shaft portion 91 and a pin connector portion 92 laterally spaced from the stub shaft portion. A separate balance weight 94 is secured to the plate 88 opposite the pin connector portion. A raised portion of the connector plate between the stub shaft 91 and the pin connector 92 provides a radial lubricant passage 95 for carrying oil.

The three center main journals 76 are formed as sleeves 96 that are inwardly splined to receive outwardly splined mating ends 97 of the stub shaft portions 91 of the associated crank arms 86. Each of the sleeves 96 engages two crank arms 86, one stub shaft 91 being received in either end. The crankpins 79 are supported on the pins 87 which extend through central openings 98 in the crankpins 79 and are received in the pin connector portions 92 of the crank arms 86 on opposite sides of their respective crankpins. An oil groove 99 along one side of the opening 98 connects with a radial passage 100 to receive oil from annular recesses 102 defined by the formed inner ends of the pin connector portions 92 and fed by the raised portion defined radial passages 95, as will be subsequently more fully described.

At its outer ends, the crankshaft 75 has special stub end main journal members 103 that include thrust collars 104 engaging thrust washers 106 backed up by the flanges 28 of the webs 20 at each end of the engine frame. The stub journals 103 are internally splined at their inner ends to receive the stub shaft portions 91 of the connected crank arms. Journals 103 also include solid outer end portions 107 to which are conventionally fastened a flywheel 108 at the rear end of the engine and a camshaft drive sprocket 110 at the front end of the engine.

To lubricate the main journal bearings 78, internal lubrication passages 111 are formed between cooperating raised portions of the two plates forming each web member 20. The passages 111 connect with annular recesses 112 at the juncture of the web flanges 28 and with radial openings in the bearings 78 and the main journals 76 to supply lubricating oil to the main journals as well as to the hollow interior of the crankshaft. From the interior of the crankshaft, lubricating oil is provided to the crankpins through the passages 95, annular recesses 102, oil grooves 99 and radial passages 100 found in the crankpin and crank arm structure previously described.

Figure 10A:
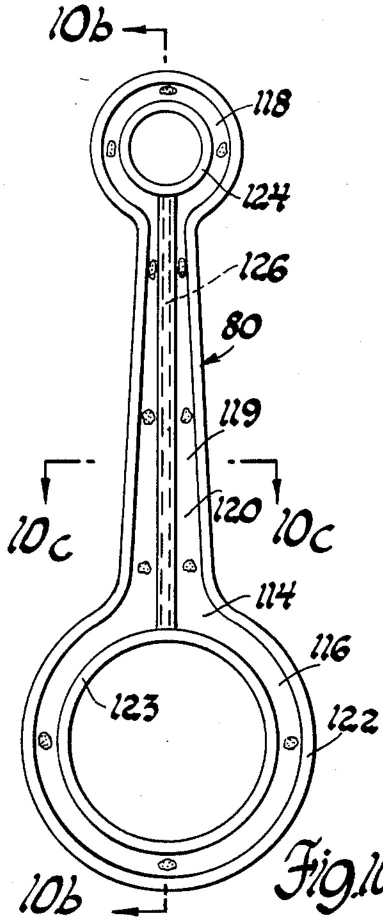
Figure 10B:
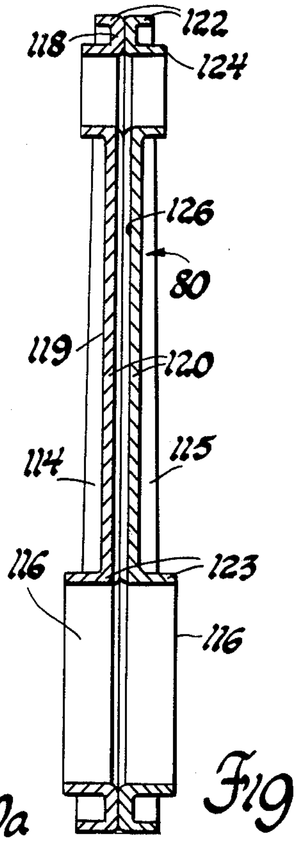
Figure 10C:
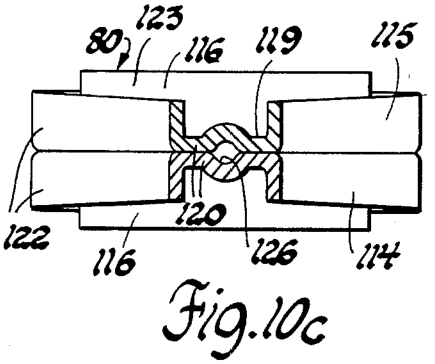

As is best seen in FIGS. 10*a*, 10*b*, 10*c*, each connecting rod 80 may be formed from a pair of identical rod shaped connecting rod halves 114, 115 having unbroken circular ends 116, 118 and a connecting strut 119. The connecting rods 80 are assembled by spot welding together back portions 120 of the rod halves, which are stiffened by outer flanges 122 around their peripheries. Inner flanges 123, 124 define crankpin and piston pin bores and are made longer than the outer flange 122 to provide end portions for engaging the crank arms and piston bosses. In this way, the ends of these inner flanges 123, 124 are the only portions of the connecting rods which require machining. If desired, oil passages 126 may be formed between the welded backs of the connecting rod halves by longitudinally extending raised portions which also provide further stiffening of the connecting rod structure. In the present arrangement, the passages 126 are not required for oil distribution purposes, but these could be used to lubricate the piston pin bearing if thought desirable.

A starter 127 is conventionally mounted to the flywheel housing 72 and extends along one side of the oil pan to drivingly engage a ring gear 128 on the flywheel 108 when required for starting the engine.

The remainder of the engine mounted accessories which are engine driven are preferably contained in a single package mounted along either side of the engine. In the present instance, the accessory package 130 is disposed along the side of the engine opposite the starter and is generally indicated by numeral 130. The accessory package 130 preferably includes a number of longitudinally aligned accessories, such as an air conditioning compressor 131, an alternator 132, a water pump 134, and an oil pump 135, on the end of which an oil filter 136 may be mounted.

The accessories are preferably driven by a common shaft 138 which carries an accessory drive sprocket 139 aligned with the crankshaft sprocket 110 at the front end of the engine. A camshaft drive sprocket 140 on the front end of the camshaft is preferably connected to be driven along with the accessory drive sprocket 139 by a belt or chain 142 connecting both sprockets with the crankshaft sprocket 110. Suitable belt tensioner means 143 may be provided to take up slack in the belt.

Figure 4:
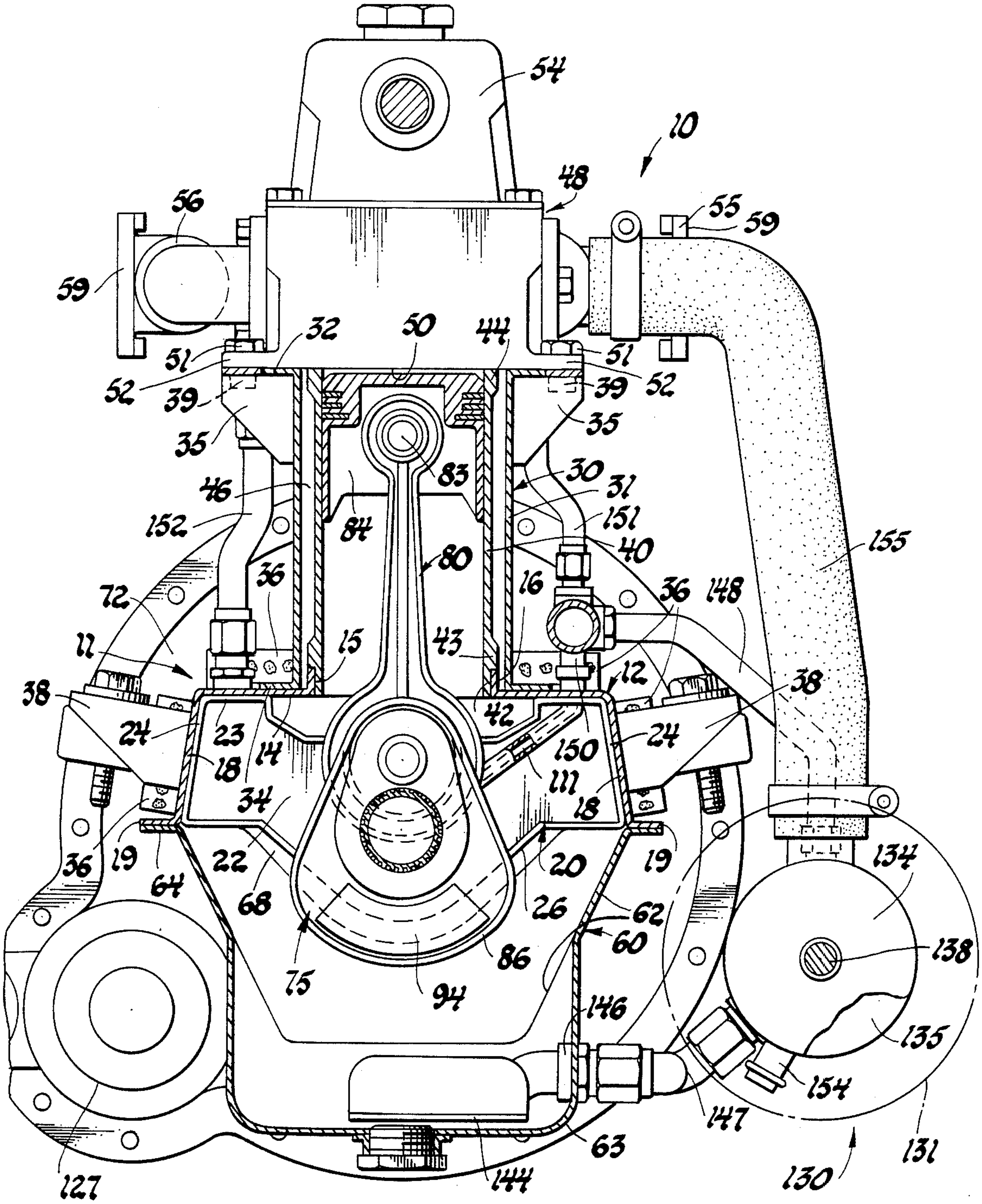
FIG. 4 is a transverse cross-sectional view from the planes generally indicated by the line 4—4 of FIG. 2 and showing the cylinder construction and main oil system connections.

To simplify manufacturing complexity and reduce the cost of the engine frame, the major lubricating oil and coolant connections may be made externally of the engine. For example, as shown in FIG. 4, the oil pump 135 receives oil from a strainer 144 in the oil pan through an internal fitting 146 and an external conduit 147. Pressurized oil, after passing through the filter 136, is delivered through a conduit 148 to manifold 150 and line 151 leading to the crankshaft bearings (through passages 111) and the cylinder head mounted camshaft bearings (not shown) respectively. Oil drain conduits 152 are provided on the other side of the engine, externally connecting the cylinder head with the engine sump to drain oil supplied to the camshaft bearings back to the sump for reuse.

Figure 5:
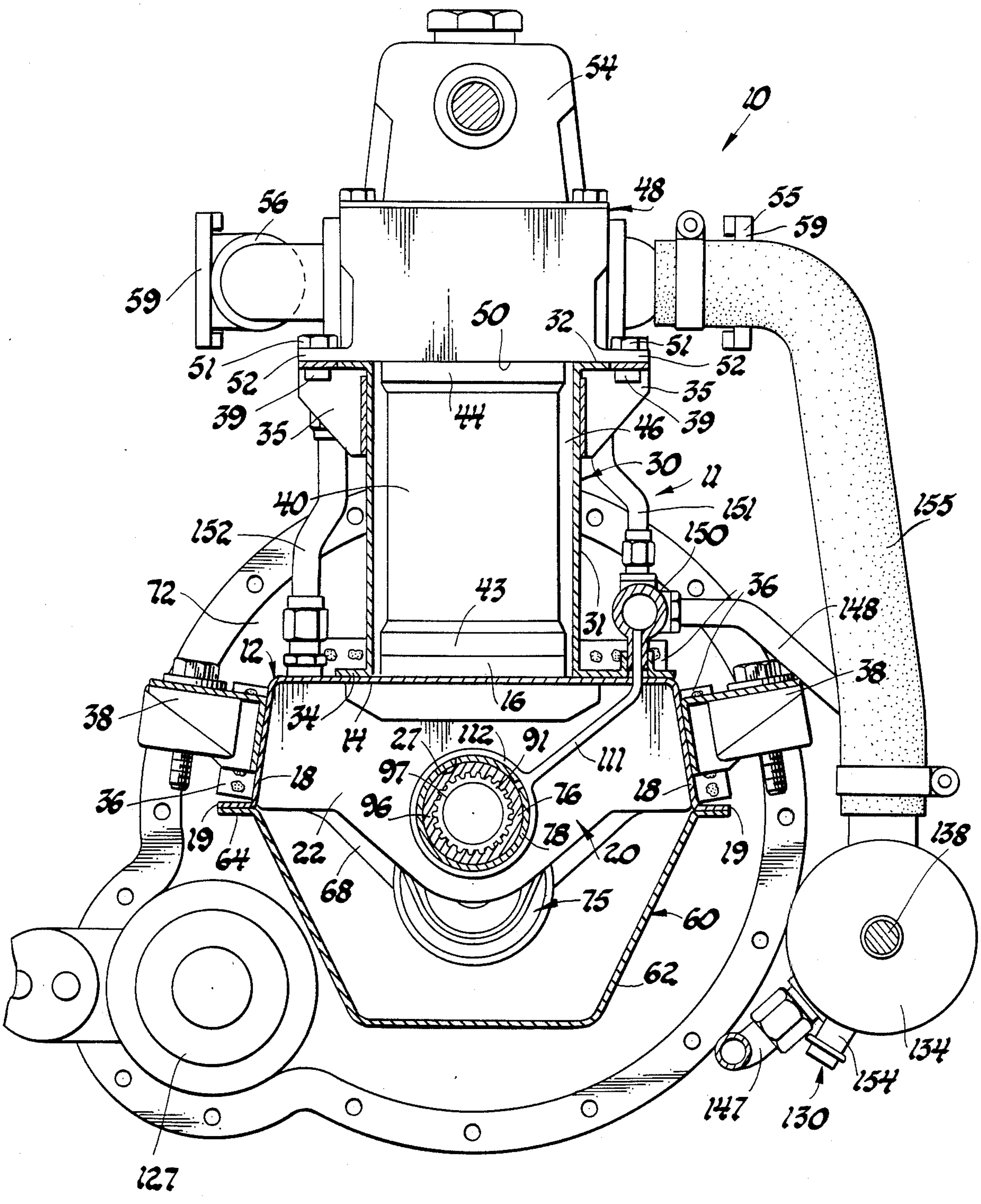
FIG. 5 is a cross sectional view from the plane indicated by the line 5—5 of FIG. 3 and showing internal construction and external main water system connections.
Figure 6:
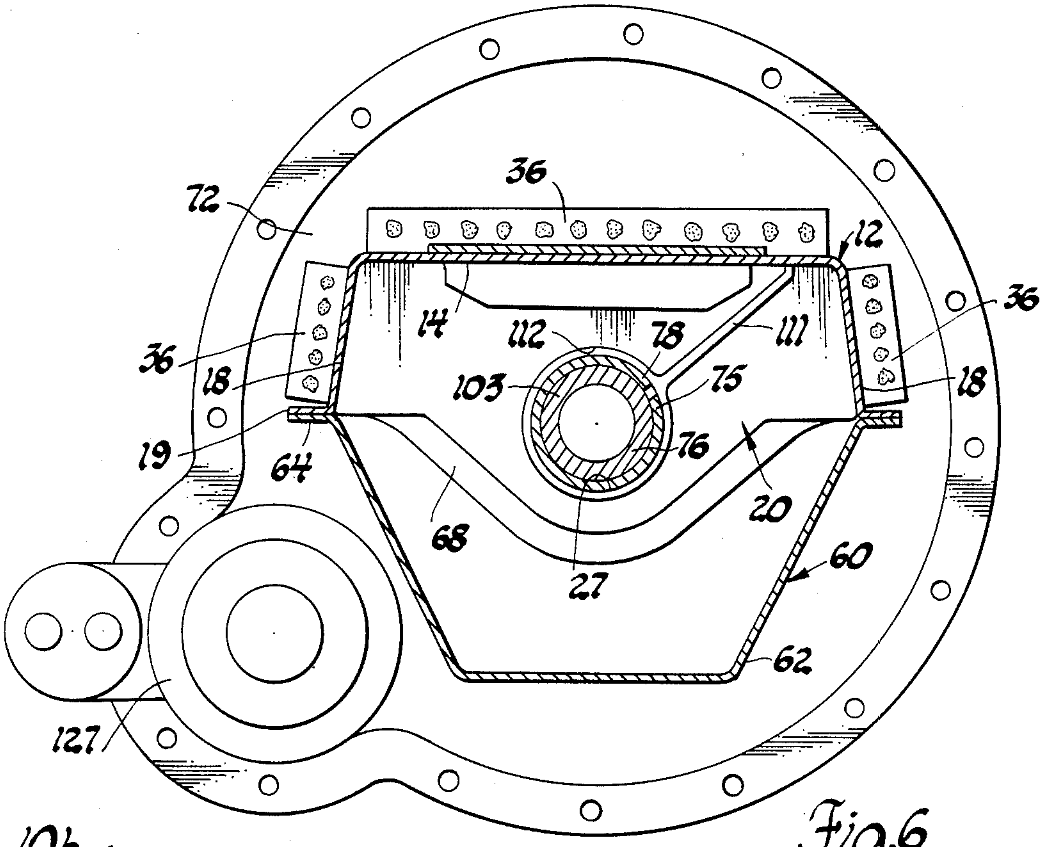
FIG. 6 is a cross-sectional view from the plane of the line 6—6 of FIG. 2 showing the flywheel housing and its mounting.

In like fashion, the engine water connections may be external as is best shown in FIG. 5. The water pump 134 receives cool water through a fitting 154 connecting with the vehicle radiator (not shown). Pressurized water is passed from the pump 134 through a hose 155 externally of the engine to the cylinder head 48 where it enters the water jacket, cooling the head. It is then distributed into the coolant chamber 46, cooling the engine cylinders, and is returned through means not shown to the radiator. If desired, however, alternative arrangements for externally or internally carrying the lubricating oil and water to the various portions of the engine could be utilized instead of those illustrated herein.

ALTERNATIVE EMBODIMENTS

While the invention has so far been disclosed by reference to a specific embodiment of an in-line four cylinder engine, it should be recognized that any number of cylinders could be utilized in an engine arrangement having essentially the same features as disclosed. In addition, other forms of engine arrangements could be provided having the same or similar features.

As an example, there is disclosed in FIG. 11 a V-type engine constructed with a fabricated frame and other components the same as or similar to those previously described with respect to an in-line engine embodiment. As may be seen, the engine frame is again made of formed steel members corresponding to those of the first described embodiment, although two banks 158 and 159 of cylinders are provided. For ease of recognition, components which are identical to, or serve the same function as, those of the first described embodiment are identified by similar reference numerals primed for identification. In the main, the components are the same, although it should be apparent that offset cylinder banks and slightly longer crankpins will be required for conventionally connecting the connecting rods of the two banks to the crankshaft. Also, instead of being U-shaped, the base member 12' of the V-engine arrangement is generally shaped as an inverted V, with the oil pan attaching flanges 19' located at the outer edges thereof.

In addition to the previously described components, FIG. 11 further illustrates centrally disposed intake and exhaust manifolds 160, 162 connected with the cylinder heads 48' and supporting an air cleaner 163 in conventional fashion.

Referring again to the crankshaft construction, it should be apparent that the unsplit construction of the main bearing webs 20 of the engine frame and the unsplit connecting rods require that the built-up crankshaft be assembled during installation piece-by-piece within the engine frame. Thus, the crankshaft 75, the construction of which is applicable to both engine embodiments thus far described, is assembled as shown in FIG. 8 by the process of first pressing the bearing sleeves 78 into the openings 27 formed by the flanges 28 of the webs. The main journals 76 are then installed, after which the crank arms 86 are located in place with the splined ends 97 of their stub shaft portions 91 engaging the splines of their respective main journal members. Thereafter, the previously installed pistons and connecting rods are connected with the crankshaft by inserting the crankpins 79 within previously installed bearing sleeves 82 of the connecting rods and connecting the crankpins with the crank arms by installation of the pins 87 in the pin connector portions 92 of the crank arms. The pins 87 may be retained in place by a suitable press fit or may be mechanically retained by other means not shown.

Figure 12A:
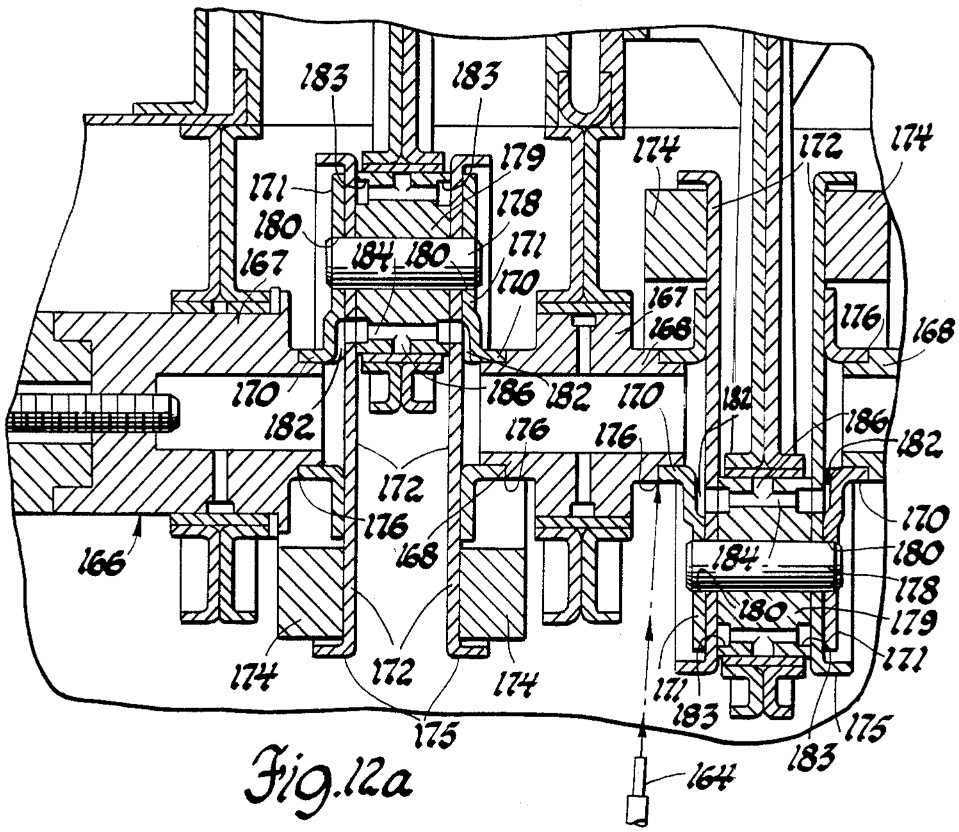
Figure 12B:
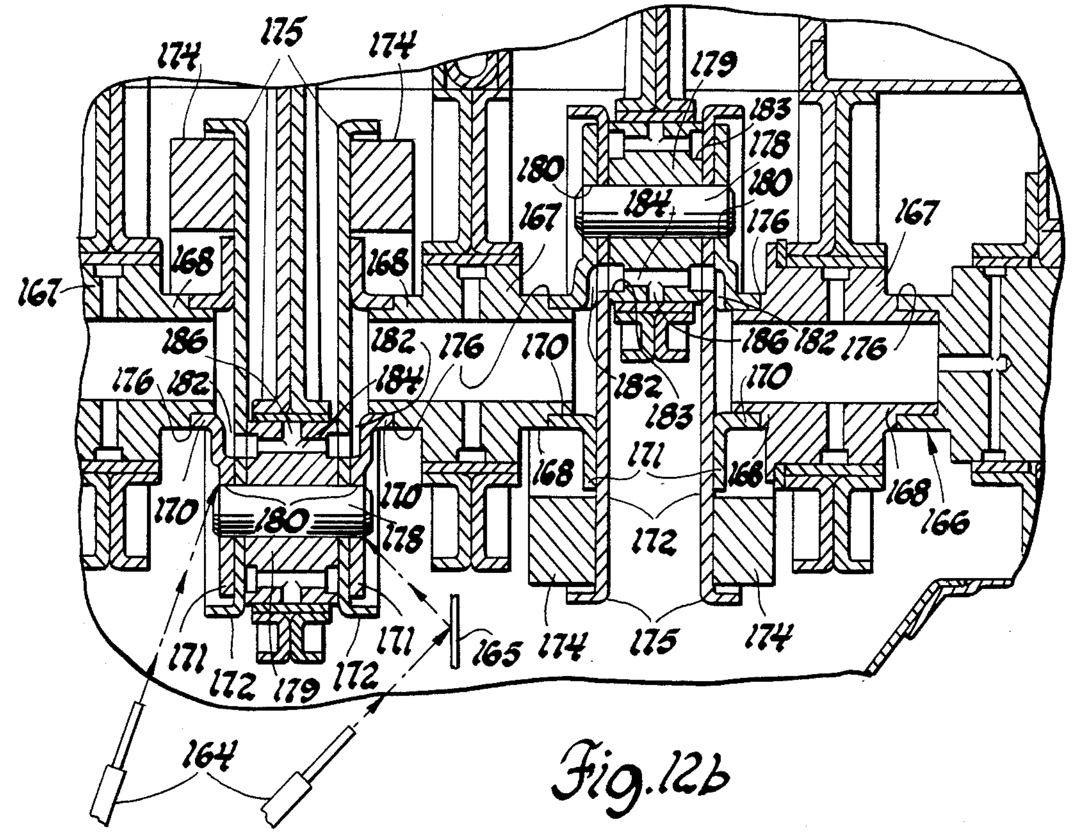

FIGS. 12*a* and 12*b* illustrate an alternative embodiment of built-up crankshaft for use in an engine of the type described wherein the assembly is designed to be permanently secured together after assembly by laser welding of the assembled components. Laser sources 164 and mirror 165 illustrate exemplary methods for the welding process. For this purpose, the crankshaft 166, though generally similar to the previously described arrangement of crankshaft 75, is modified as follows. The main journals 167 are stepped sleeves having reduced diameter ends 168. On these are received unsplined ends of stub shaft portions 170 extending from the connector plates 171 that, together with the formed plates 172 and attached balance weights 174, make up the crank arms 175. This construction provides joints 176 that are externally exposed to allow laser welding of the components after assembly in the engine to thus provide an integral structure.

In like manner, the support pins 178 supporting the crankpins 179 extend through openings 180 in otherwise flat portions of the crank arm connector plates 171 to provide a joint capable of being laser welded to form a solidly attached assembly upon installation in the engine.

As a result of the modified pin retention method, the lubrication passages for the crankpin journals are also revised to utilize shorter passages 182 in the crank arms connecting annular grooves 183, longitudinal bores 184 and radial passages 186 to distribute oil from the hollow crankshaft interior. In other respects, the construction of the welded crankshaft 166 is generally similar to that of crankshaft 75 previously described so that further detailed description is not believed necessary.

It should be apparent from the foregoing description of various embodiments of engines and their components formed in accordance with the principles of the present invention that the invention provides features of construction simplicity and manufacturing capability having substantial potential advantages in reduction of weight and cost over more conventional engine configurations. Further it should be recognized that the numerous features of the invention, as disclosed in the described embodiments, could be applied to other engine configurations and components and that numerous changes could be made in the described embodiments without departing from the spirit and scope of the inventive concepts described. Accordingly, it is intended that the invention not be limited to the described embodiments but that it have the full scope permitted by the following claims.

The embodiments of the invention in which an exclusive property or privilege is claimed are defined as follows:

1. A lightweight internal combustion engine including a main cylinder and crankcase assembly having an open top closed by a cylinder head and a closed bottom, said main assembly comprising a fabricated frame including a base member of stiff sheet material formed to define an upper crankcase wall having a plurality of longitudinally spaced upwardly flanged cylinder opening means each having an upper edge, a plurality of longitudinally spaced stiffening and crankshaft supporting webs formed of stiff sheet material and secured to said base member upper wall, said webs including main bearing opening means aligned longitudinally for rotatably supporting a crankshaft, and an upstanding continuous water jacket having a lower edge secured to said base member peripherally around said cylinder opening means and having an upper edge secured to said cylinder head, and a plurality of removable cylinder liners within said water jacket, each liner having a lower portion sealingly engaging and extending within the upper edge of one of said flanged cylinder opening means and having an upper end sealingly engaging said cylinder head.

2. A lightweight internal combustion engine including a main cylinder and crankcase assembly having an open top closed by a removable cylinder head and an open bottom closed by an oil pan, said main assembly comprising a fabricated frame including a base member of stiff sheet metal formed to define an upper crankcase wall having a plurality of longitudinally spaced upwardly flanged cylinder opening means each having an upper edge, and a pair of side walls depending from said upper wall, a plurality of longitudinally spaced stiffening and crankshaft supporting webs formed of stiff sheet metal and welded in said base member to said upper and side walls, said webs including flanged main bearing opening means aligned longitudinally for rotatably supporting a crankshaft, and an upstanding continuous water jacket formed of stiff sheet metal and having a lower edge welded to said base member peripherally around said cylinder opening means and having an upper edge secured to said cylinder head, and a plurality of removable cylinder liners within said water jacket, each liner having a lower portion sealingly engaging and extending within the upper edge of one of said flanged cylinder opening means and having an upper end sealingly engaging said cylinder head.

3. A fabricated frame for a lightweight engine including a base member of stiff sheet material formed to define an upper crankcase wall having a plurality of longitudinally spaced upwardly flanged cylinder opening means each having an upper edge defining a seat for a removable cylinder liner having a lower portion adapted to sealingly engage and extend within said upper edge, and a pair of side walls depending from said upper wall, a plurality of longitudinally spaced stiffening and crankshaft supporting webs formed of stiff sheet material and secured to said base member upper and side walls, said webs including main bearing opening means aligned longitudinally for rotatably supporting a crankshaft, and an upstanding continuous water jacket having a lower edge secured to said base member peripherally around said cylinder opening means and having an upper edge adapted to be secured to a cylinder head.

4. A fabricated frame as in claim 3 wherein said base, webs and water jacket are formed of stiff sheet metal and are welded into an integral assembly.

5. A built-up crankshaft comprising a plurality of coaxial, spaced main journals, crank throws interconnecting each of said main journals, each crank throw having a pair of crank arms and a crankpin, each said crank arm comprising a welded assembly of a flanged carrying plate and a hub member, both formed of stiff sheet metal, and counterweights carried by the carrying plates of at least some of said crank arms, said hub members each having a hollow hub portion nonrotatably engaging an adjacent one of said main journals, said crankpins being carried between the crank arms of their respective crank throws by support pins carried in coaxial hub openings in the paired crank arm hub members.

6. A built-up crankshaft as in claim 5 wherein said main journals are internally splined sleeves and said crank arm hub members are externally splined and engaged with the internal splines of associated main journals rotatably connecting the crank throws with the main journals.

7. A built-up crankshaft as in claim 5 wherein said crank arms are laser welded to the main journals and the support pins after installation in the engine to rotatably connect the crankshaft in an integral assembly.

8. A lightweight internal combustion engine including a main cylinder and crankcase assembly having an open top closed by a cylinder head and an open bottom closed by an oil pan, said main assembly comprising a fabricated frame including a base member of stiff sheet metal formed to define an upper crankcase wall having a plurality of longitudinally spaced upwardly flanged cylinder opening means each having an upper edge, and a pair of side walls depending from said upper wall, a plurality of longitudinally spaced stiffening and crankshaft supporting webs formed of stiff sheet metal and welded in said base member to said upper and side walls, said webs including longitudinally unsplit flanged nonseparable main bearing opening means aligned longitudinally for rotatably supporting a crankshaft, and an upstanding continuous water jacket formed of stiff sheet metal and having a lower edge welded to said base member peripherally around said cylinder opening means and having an upper edge secured to said cylinder head, a plurality of removable cylinder liners within said water jacket, each liner having a lower portion sealingly engaging and extending within the upper edge of one of said flanged cylinder opening means and having an upper end sealingly engaging said cylinder head, and a crankshaft rotatably supported in the unsplit main bearing opening means of said frame webs, said crankcase being built up of separate elements assembled in place in said crankcase to concurrently assemble and install the completed crankshaft in said engine.

9. An engine as in claim 8 and further including pistons reciprocably disposed one in each of the cylinder liners and each connected by a connecting rod to a crankpin of an associated throw of the crankshaft, said connecting rods each having longitudinally unsplit crankpin bearing opening means at one end for connection with the crankshaft and said connecting rods being connected in place to respective crankpins during the build-up and installation of the crankshaft in the engine.

10. An engine as in claim 9 wherein at least one of said frame webs is built up of contacting sheet metal members formed to defined oil passages between them to feed oil to the crankshaft main bearings and said crankshaft comprises hollow main journals and crankpins having built-up crank arms with oil passages formed between separate members and interconnecting the adjacent main journals and crankpins to feed oil to crankpin bearings in the connecting rods.

11. An engine as in claim 8 and further including an accessory package having a plurality of engine driven accessories carried on the engine and having a common drive input member, said accessory package being mounted adjacent the engine frame and driven by drive means between the engine crankshaft and the accessory drive input member.

12. An engine as in claim 11 wherein said cylinder head carries a camshaft having a drive input member, and said accessory package is mounted alongside said engine frame with its drive input member aligned with that of the camshaft, said drive means drivingly connecting the crankshaft with the drive input members of both the camshaft and the accessory package.

* * * * *